United States Patent Office 3,113,929
Patented Dec. 10, 1963

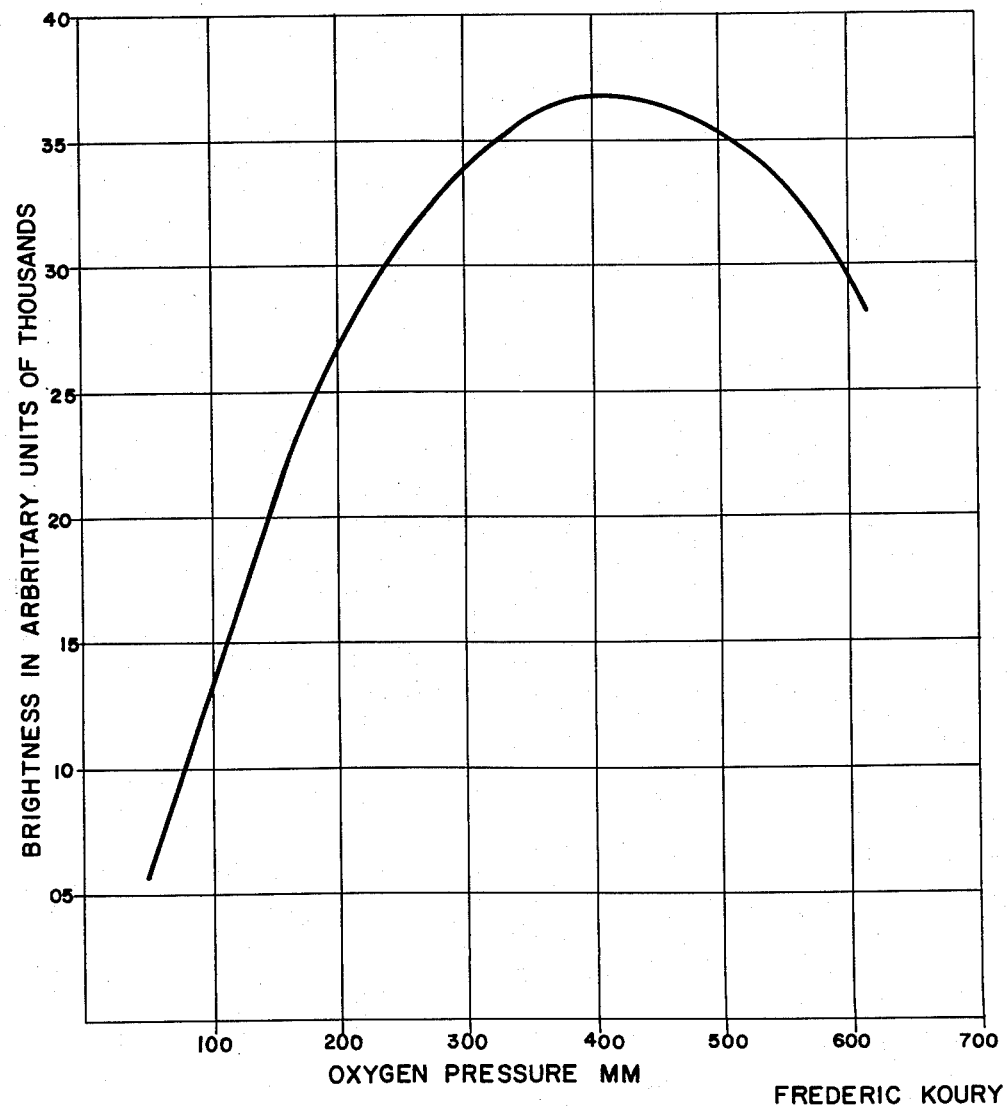

3,113,929
METHOD FOR INCREASING THE BRIGHTNESS OF ELECTROLUMINESCENT PHOSPHORS
Frederic Koury, Lexington, Mass., assignor to Sylvania Electric Products Inc., a corporation of Delaware
Filed July 12, 1960, Ser. No. 42,310
3 Claims. (Cl. 252—301.6)

This invention relates to electroluminescent phosphors, that is, to phosphors which emit light when excited by an electric field, especially a varying or alternating electric field.

I have discovered that the brightness of such phosphors can be greatly increased by heating them in an atmosphere containing oxygen in certain amounts. I have further discovered that the concentration of oxygen needed for best results is greater than the concentration normally present in air. At the usual atmospheric pressure of 760 mm. of mercury, the oxygen present, being about 20%, has a partial pressure of about 152 mm., whereas I find that 400 mm. oxygen pressure gives a phosphor of maximum brightness when excited by an electric field.

Other objects, features and advantages of the invention will be apparent from the following specification, taken in conjunction with the accompanying drawing, in which the FIGURE is a graph showing the variation in light output of the phosphor with the concentration of oxygen in the atmosphere during firing.

In one embodiment of the invention, a phosphor was prepared by mixing the following materials intimately as fine powders in the proportions indicated:

| | Gram-moles |
|---|---|
| ZnS | 0.90 |
| ZnO | 0.05 |
| MgO | 0.05 |
| $CuCO_3 \cdot Cu(OH)_2$ | 0.0008 |
| $PbCO_3$ | 0.001 |

The mixture is ballmilled in the usual manner and fired at 1720° F. in a 6-inch silica boat for about 40 minutes in an atmosphere of nitrogen. Instead of using a nitrogen atmosphere, the ingredients of the phosphor can be placed in a crucible with an ordinary crucible cover in place, and fired in air. The resultant material is then ballmilled again and refired for the same time under the same conditions. The material is then cooled, in a nitrogen atmosphere or in a covered crucible for example, and then washed in a 7% acetic acid solution, rinsed, rewashed in a 2% acetic acid solution, then rinsed in deionized water and dried at between 150 to 170° F. The resultant phosphor will be electroluminescent and may be sometimes herein called the "control phosphor."

About 10 grams of the resultant control phosphor are then placed in a silica boat about six inches long by one inch wide and one inch deep. The boat is placed in a silica tube, which is sealed, connected to an exhaust pump and evacuated to a pressure of a few microns.

Oxygen is then admitted into the tube at pressures which varied from 50 mm. of mercury in one example to 600 millimeters in another. For pressures below 400 mm. enough argon or other inert gas was added to bring the total pressure up to 400 mm. to prevent evaporation of any components of the phosphor. An oxygen pressure of about 400 mm. gave the brightest phosphor, as indicated by the graph in the figure.

The heating in oxygen was continued for about two hours, and the phosphor then cooled to room temperature in the same atmosphere. The length of the heating and cooling periods was not critical.

The control electroluminescent phosphor, before the oxygen treatment had a brightness of 17,000 units, whereas the phosphor heated in 400 mm. pressure of oxygen, had a brightness of 37,000 units. The units were arbitrary but on a linear scale of brightness. The light output from the phosphor was thus more than doubled by the treatment.

The light output measurements were made by placing the phosphor in a castor oil electroluminescent cell, as shown in U.S. Patent 2,838,715, issued June 10, 1958, to Elmert C. Payne. The units used are different from those of the patent.

It will be noted that at a pressure of 400 mm., the concentration of oxygen is greater than that in air, in which the oxygen pressure (so-called "partial pressure of oxygen") would be only about 152 mm.

The gain in brightness above that of the phosphor before treatment begins to be evident at pressures just slightly below the 152 mm. oxygen pressure which would be obtained with air, and the use of oxygen pressures above those present in air under standard conditions of temperature and pressure is beneficial up to a pressure of about 650 mm., with the maximum brightness occurring at about 400 mm. pressure.

Although the specific example above is for a phosphor-containing lead, the invention is not limited to that particular phosphor, but similar gains in brightness are obtained with other electroluminescent phosphors, especially those of the zinc sulfide type. The use of argon at low pressures is not essential, but in the case of a lead-containing phosphor can help to prevent loss of lead on firing.

The phosphor treated with oxygen according to my invention will generally be improved by washing with acetic acid as previously mentioned, as excess oxide is likely to be formed. Washing with other substances which will remove zinc oxide without removing zinc sulfide can be used instead, with a sulfide type phosphor. However, some gain is obtained above about 150 mm. oxygen pressure, even without the washing, as the amount of free oxide produced is apparently not very high. By free oxide I mean oxide separate from the sulfide crystals, as distinguished from oxygen which goes into the crystal, or which forms a junction with the crystal.

The pressures given are at room temperature and pressure, that is at about 20° C. and 152 mm. of mercury pressure. These pressures rise on heating but the gas density remains the same, because the amount of gas present and the volume in which it is enclosed are kept constant. The gas is introduced into a silica tube containing the silica boat which holds the phosphor and the tube is then sealed off, keeping the amount of gas static, except for the amount which reacts with the phosphor.

What I claim is:
1. The method of treating a phosphor to increase its electroluminescence, said process comprising the step of heating the phosphor to a temperature between about 700° C. and 1000° C. in the presence of oxygen at a density corresponding to an oxygen pressure between about 150 mm. and 650 mm. of mercury at a temperature of 20° C.

2. The method of treating a zinc sulfide phosphor to increase its electroluminescence which includes the step of heating the phosphor to a temperature between about 700° C. and 1000° C. in an otherwise inert atmosphere containing oxygen at a pressure of about 400 mm. of mercury.

3. The method of treating a zinc sulfide phosphor to increase its electroluminescence, said process comprising placing the phosphor in an evacuated space, introducing oxygen at a pressure between about 150 mm. and 650 mm. of mercury, and then heating the phosphor to a temperature between 700° C. and 1000° C. in the presence of said atmosphere.

References Cited in the file of this patent

UNITED STATES PATENTS 2,402,759    Leverenz _____ June 25, 1946

FOREIGN PATENTS 782,095    Great Britain _____ Sept. 4, 1957
970,869    Germany _____ Nov. 6, 1958